(12) United States Patent
Gottesfeld et al.

(10) Patent No.: US 7,510,794 B2
(45) Date of Patent: Mar. 31, 2009

(54) CONFORMABLE FUEL CELL

(75) Inventors: Shimshon Gottesfeld, Niskayuna, NY (US); William P. Acker, Rexford, NY (US); Robert S. Hirsch, Troy, NY (US)

(73) Assignee: MTI MicroFuel Cells, Inc., Albany, NY (US)

( * ) Notice: Subject to any disclaimer, the term of this patent is extended or adjusted under 35 U.S.C. 154(b) by 574 days.

(21) Appl. No.: 10/791,101

(22) Filed: Mar. 2, 2004

(65) Prior Publication Data

US 2005/0196666 A1 Sep. 8, 2005

(51) Int. Cl.
*H01M 8/02* (2006.01)
*H01M 8/10* (2006.01)

(52) U.S. Cl. .................................. 429/34; 429/127
(58) Field of Classification Search ............... 429/34, 429/127
See application file for complete search history.

(56) References Cited

U.S. PATENT DOCUMENTS

| | | | |
|---|---|---|---|
| 4,973,531 A * | 11/1990 | Zaima et al. | 429/37 |
| 6,045,575 A * | 4/2000 | Rosen et al. | 607/88 |
| 6,127,058 A | 10/2000 | Pratt et al. | |
| 6,268,077 B1 * | 7/2001 | Kelley et al. | 429/33 |
| 6,620,542 B2 * | 9/2003 | Pan | 429/41 |
| 7,255,947 B2 * | 8/2007 | Becerra et al. | 429/13 |
| 2001/0041281 A1 * | 11/2001 | Wilkinson et al. | 429/34 |
| 2002/0071984 A1 * | 6/2002 | Dristy et al. | 429/37 |
| 2002/0098402 A1 | 7/2002 | Fan et al. | |
| 2005/0048349 A1 * | 3/2005 | Fannon et al. | 429/36 |

FOREIGN PATENT DOCUMENTS

JP 02234358 A * 9/1990

\* cited by examiner

*Primary Examiner*—Gregg Cantelmo
(74) *Attorney, Agent, or Firm*—Cesari and McKenna LLP

(57) ABSTRACT

A conformable fuel cell is provided which includes a basic structure that provides flexibility while providing a high compression along the active surface of the fuel cell's membrane electrode assembly, which can be achieved by an injection-molded frame. A suitable fuel is delivered to the anode aspect of the fuel cell. Effective water management could also be provided by appropriate diffusion layers. The fuel cell can be contour-molded to a desired shape, or can be constructed of an array of flexibly connected individual fuel cells that overall have a curvilinear shape, or can be constructed as a pliable fuel cell that can be incorporated into an application device or an article of clothing.

11 Claims, 4 Drawing Sheets

CONFORMABLE FUEL CELL

BACKGROUND OF THE INVENTION

1. Field of the Invention

This invention relates generally to fuel cells, and, more particularly, to fuel cells that are conformable into desired shapes and that can be incorporated into the outer wall of a product or clothing.

2. Background Information

Fuel cells are devices in which electrochemical reactions are used to generate electricity from fuel and oxygen. A variety of materials may be suited for use as a fuel depending upon factors such as fuel availability and portability. Carbonaceous materials, such as methanol or natural gas, are attractive fuel choices due to their high specific energy.

Fuel cell systems that operate on carbonaceous fuels may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing upstream the fuel cell. Because fuel processing generally requires complex and expensive components, which occupy significant volume, reformer-based systems are presently limited to comparatively large, high power applications. Other, "direct hydrogen" systems require that pure hydrogen gas be fed to the anode of a fuel cell system, limiting their application.

Direct oxidation fuel cell systems using liquid fuel are better suited for a number of applications in smaller mobile devices (e.g., mobile phones, handheld and laptop computers), as well as in some larger applications. In the direct oxidation fuel cells of interest here, i.e. those that use a polymer electrolytes, a carbonaceous liquid fuel (typically methanol or an aqueous methanol solution) is introduced to the anode face of a membrane electrode assembly (MEA).

One example of a direct oxidation fuel cell system is a direct methanol fuel cell system or DMFC system. In a DMFC system, a mixture comprised of predominantly methanol or methanol and water is used as fuel (the "fuel mixture"), and oxygen, preferably from ambient air, is used as the oxidizing agent. The fundamental reactions are the anodic oxidation of the fuel mixture into $CO_2$, protons, and electrons; and the cathodic combination of protons, electrons and oxygen into water.

Typical DMFC systems include a fuel source, fluid and effluent management systems, and air management systems, as well as a direct methanol fuel cell ("fuel cell") stack, or array, consisting of single cells connected electrically in series. The fuel cell stack, or array, typically consists of a housing, hardware for current collection, fuel and air distribution, and a number of membrane electrode assemblies ("MEAs") disposed within the housing.

The electricity generating reactions and the current collection in polymer electrolyte direct oxidation fuel cell systems generally take place within the MEA. In the carbonaceous fuel oxidation process at the anode, the products are protons, electrons and carbon dioxide. Protons (from hydrogen atoms in the fuel and in water molecules involved in the anodic reaction) are separated from the electrons. The protons migrate through the membrane electrolyte, which is non-conductive to the electrons. The electrons travel through an external circuit, which connects the cell to the load where power is utilized, and are united with the protons and oxygen molecules in the cathodic reaction.

A typical MEA includes an anode catalyst layer and a cathode catalyst layer sandwiching a centrally disposed protonically-conductive, electronically non-conductive membrane ("PCM", sometimes also referred to herein as "the catalyzed membrane"). One example of a commercially available PCM is NAFION® (NAFION® a registered trademark of E.I. Dupont de Nemours and Company), a cation exchange membrane based on polyperfluorosulfonic acid, in a variety of thicknesses and equivalent weights. The PCM is typically coated on each face with an electrocatalyst such as platinum, or platinum/ruthenium mixtures or alloy particles. A PCM that is optimal for fuel cell applications possesses a good protonic conductivity and is well-hydrated in the operating cell. On either face of the catalyst coated PCM, the MEA typically includes a diffusion layer. The diffusion layer on the anode side is employed to evenly distribute the liquid or gaseous fuel over the catalyzed anode face of the PCM, while allowing the reaction products, typically gaseous carbon dioxide, to move away from the anode face of the PCM. In the case of the cathode side, a diffusion layer is used to allow a sufficient supply of and a more uniform distribution of gaseous oxygen to the cathode face of the PCM, while minimizing or eliminating the accumulation of liquid, typically water, on the cathode aspect of the PCM. Each of the anode and cathode diffusion layers also assist in the collection and conduction of electric current from the catalyzed PCM through to the load. Further details of the operation of a direct oxidation fuel cell and a discussion of fuel substances including a gel-based carbonaceous fuel substance are discussed in detail in commonly-owned U.S. Pat. No.: 7,255,947 issued on Aug. 14, 2007 by Juan J. Becerra et al. for a FUEL SUBSTANCE AND ASSOCIATED CARTRIDGE FOR FUEL CELL, filed Oct. 17, 2003, which is incorporated herein by reference.

Direct oxidation fuel cells are particularly suited for use with small portable electronic devices based on the sufficiency of such fuel cells' power output and the ability to manufacture the comparatively simple direct oxidation fuel cell system on a micro-level. Although certain non-planar designs have been suggested, as are noted hereinafter, it has not been heretofore known, however, to manufacture a fuel cell system that is configured to substantially conform to a predetermined non-planar shape, or which is disposed on a pliable substrate, and is therefore a pliable assembly. More specifically, it is desirable in certain applications to incorporate a fuel cell into an article of clothing (such as a belt or vest) or a surface of an application device in such a manner that the fuel cell incorporated into those items thus powers devices being used by the individual, such as telephones, personal digital assistants, other communication devices, GPS positioning and location devices, tracking devices, beepers, weaponry, listening aides and other equipment of an electronic nature that may be used, for example, by a soldier, law enforcement officer, security personnel or a person in an industry in which it is desirable to wear or employ a number of electronic devices on one's person, each of which require power. In such instances, it may be inconvenient to carry batteries or replacement batteries for each individual device. More importantly, the energy density of known batteries is not typically sufficient to allow an acceptable operating duration given their weight and volume characteristics.

It has been described how flexibility could be provided to the current collector of a fuel cell, which would allow the cell to be formed into certain non-planar shapes, including cylinders. However, it is important for maintaining optimum fuel cell performance to not just introduce non-planar or flexible components, but to maintain sufficient compression along the active surface area of the fuel cell. This is particularly important in a fuel cell that utilizes a polymer electrolyte without an additional liquid electrolyte, where the fuel cell typically cannot reliably generate power without sufficient compression (typically 100 psi or greater) over the active area that guarantees good current collector/MEA contact. Attempts to develop non-planar fuel cells that have been described do not appear to provide for adequate compression for the operation of a fuel cell. See, e.g. U.S. Pat. No. 6,620,542. Furthermore, incorporation of a fuel cell into an article of clothing, such as a vest, or into a fabric, that can then be sewn or otherwise attached to another article of clothing or a device, has not been considered.

As used herein, when used to describe a fuel cell, a fuel cell array or a fuel cell system, "conformable" shall mean being fabricated in such a fashion as to generally conform to the contours of the desired application or being sufficiently pliable to allow the assembly to meet a variety of shapes or to change shape based on the form of the object to which it is attached. There remains a need, therefore, for a viable conformable fuel cell that can be formed in a desired shape, including curved fuel cells and multifaceted fuel cells which can then be worn by an individual, or which can be incorporated into the fabric of an article of clothing or itself can comprise the whole article of clothing, or a panel thereof, or incorporated into a device, to supply power to devices being utilized by that individual.

It is thus an object of the present invention to provide a well-performing, conformable fuel cell that can either be formed in a desired shape that conforms to a particular body segment or location, or an application device, or which can be incorporated into an article of clothing within the fabric used for such clothing, or as a pliable fuel cell to be coupled to a device.

SUMMARY OF THE INVENTION

The present invention provides a number of solutions to the problems identified herein with a viable conformable fuel cell, which can be implemented in a number of alternative embodiments. As used herein, when used to describe a fuel cell, a fuel cell array or a fuel cell system, "conformable" shall mean being fabricated in such a fashion as to generally conform to the contours of the desired application or being sufficiently pliable to allow the assembly to meet a variety of shapes or to change shape based on the form of the object to which it is attached. In the manufacture of each of the embodiments of the invention, a structure is formed that provides flexibility while providing, at the same time, a high compression along the active surface of the fuel cell. In accordance with one aspect of the invention, this compression is achieved by an injection-molded frame. In one embodiment, a layer of gelled fuel that conforms to the desired shape is then affixed to the anode aspect of the fuel cell. A vaporous fuel is fed from the gel to the anode aspect, which thus minimizes leakage and allows ready carbon dioxide release. Furthermore, the membrane electrode assembly and cathode aspect of the fuel cell is constructed in such a manner that cathode reaction-produced water is pushed back across the membrane for use in the anode reaction, thus obviating a necessity for carrying additional water, or for water recirculation.

There are a number of physical implementations that such a conformable fuel cell can take in accordance with the present invention. The fuel cell may itself substantially conform to the form of a device to which it provides power, or to a body segment on which it is to be mounted or otherwise attached. More specifically, the fuel cell may be formed of materials that, when molded into a desired shape, retain that shape, which can thus conform to a particular body segment and can be worn accordingly by an individual to power the electronic devices that he or she is using. This type of conformable fuel cell is manufactured by framing the membrane electrode assembly and current collectors with a contoured mold and an injection-molded outer plastic shell is formed to a desired shape. Once said frame is molded, the fuel cell is locally well compressed, and also contoured to fit a desired body segment or product contour.

In accordance with another embodiment of the invention, a fuel cell system is comprised of a plurality of smaller individual planar fuel cells that are mechanically connected together in such a manner that the overall sheet of fuel cells is conformable to various non-planar shapes. This fuel cell array may also be arranged in rows of side-by-side fuel cells, which are connected in a hinged fashion to form a segmented fuel cell array. In either case, each individual fuel cell includes an anode plate that provides for a simple interconnection with the cathode of another cell, with the exception of the "terminal cells" which represent the first and last cells of a portion of the array. The entire array of fuel cells can thus be incorporated into a design that is either of a curvilinear shape, or which can be worn and adjusted to the body location of the individual wearing the segmented fuel cell array.

In accordance with a third embodiment of the invention, the fuel cell comprises a pliable fuel cell, which in one implementation comprises an article of clothing, such as a vest, thus forming a wearable fuel cell. In this design, the membrane electrode assembly materials, diffusion layers and a flexible conductive mesh (current collectors) together form a layered fuel cell that is properly framed to achieve the required compression and which is then sewn in between layers of fabric to form at least part of a pliable fuel cell which may be a wearable garment, or which may be attached to the suitable application device.

The fuel delivery method to be used with the devices of the present invention includes any suitable fuel delivery means adaptable for use with the various types of fuel cells described herein, and these fuel delivery methods may utilize liquid fuels, vaporous fuels, or a combination thereof. By way of example, and not of limitation, a gelled fuel substance may be placed adjacent the anode aspect, which emits a vaporous fuel in a continuous manner directly to the anode, or which may be regulated using methods known to those skilled in the art, as discussed in the following commonly-owned United States Patent Applications, i.e., U.S. Patent Application Publication No. 2004/0209136, published on Oct. 21, 2004, by Ren et al., for a DIRECT OXIDATION FUEL CELL OPERATING WITH DIRECT FEED OF CONCENTRATED FUEL UNDER PASIVE WATER MANAGEMENT, and U.S. Pat. No. 7,255,947 issued on Aug. 14, 2007, by Becerra et al. for a FUEL SUBSTANCE AND ASSOCIATED CARTRIDGE FOR FUEL CELL, filed Oct. 17, 2003, which are both incorporated herein by reference.

However, the invention is not limited to a single fuel delivery system, as alternate fuels and methods of fuel delivery are possible, including but not limited to pumping or wicking liquid fuels, or using pressurized fuel tanks to cause such liquid fuel to flow to the anode aspect of the fuel cell, and other methods known to those skilled in the art. It is further possible to implement a fuel which is a combination of liquid and gel, where the liquid re-saturates the gel followed by vapor delivery from the gel to the anode. The gel is then a conforming layer following the contours of the fuel cell array and the liquid is in an additional reservoir which may be detachably coupled to the fuel cell array, or otherwise in fluid communication with the fuel cell array, or which may be carried independently from the fuel cell array.

The above-described devices embodying the invention provide, for example, a conformable fuel cell system that can be employed as an integral part of an article of clothing or accessory that can be worn by a soldier, law enforcement officer, or other person's clothing or body, for powering electronic devices, and/or which can be incorporated into the shape or contour of an application device, and which provides at least two times the energy density of state of the art batteries.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
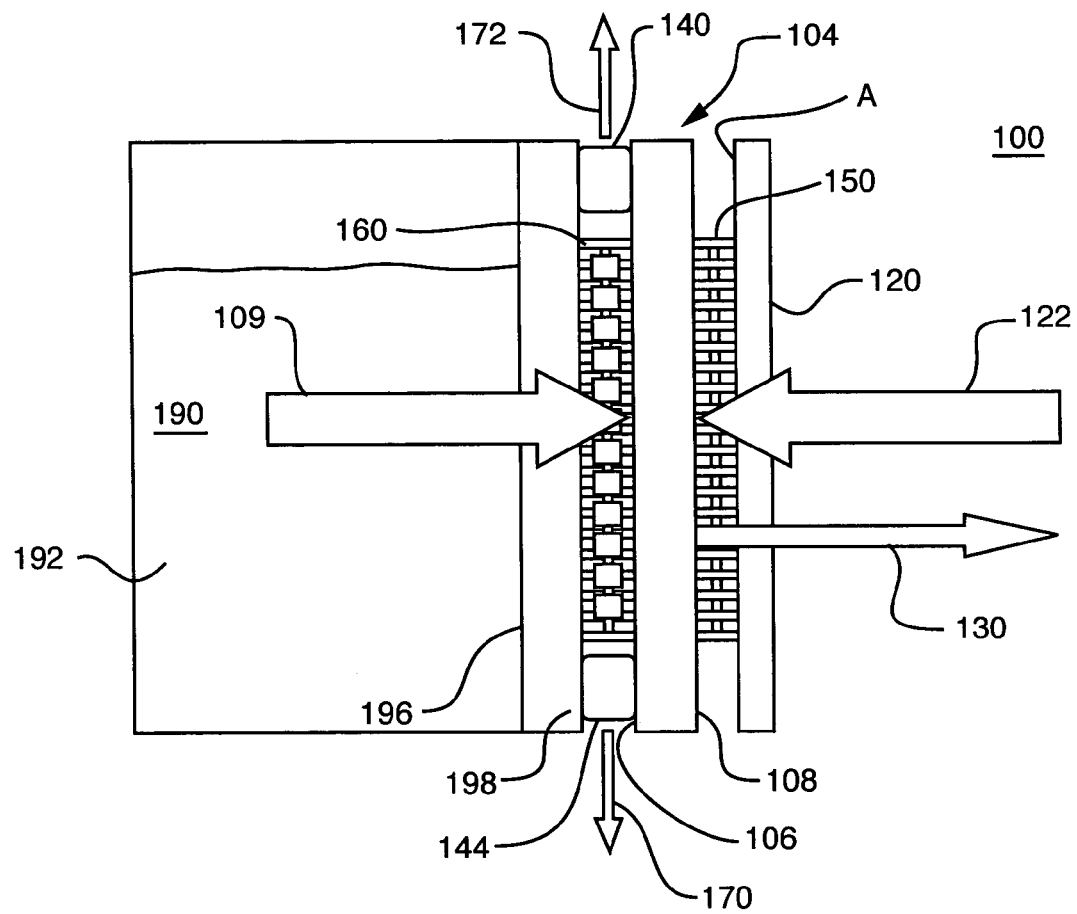
FIG. 1 is a schematic illustration of basic fuel cell components that can be employed within the various embodiments of the present invention.

By way of background, the components and mode of operation that can be used for the conformable fuel cell of the present invention will now be described. FIG. 1 is a simplified schematic illustration of one embodiment of a direct oxidation fuel cell that may be used with the present invention. The figure illustrates one embodiment of a direct oxidation single fuel cell for purposes of description that allows implementation of curvilinear arrays based on small planar segments and on a unique technology platform described in commonly-owned United States Patent Application No. U.S. Pat. No. 6,981,877, filed on Feb. 19, 2002, by Ren et al., for a SIMPLIFIED DIRECT OXIDATION FUEL CELL SYSTEM, and U.S. patent application Ser. No. 10/260,820, filed on Sep. 30, 2002, by Ren et al., for a FLUID MANAGEMENT COMPONENT FOR USE IN A FUEL CELL, which are incorporated herein by reference, and the above-cited U.S. Pat. No. 7,407,721 filed on Apr. 15, 2003, for a DIRECT OXIDATION FUEL CELL OPERATING WITH DIRECT FEED OF CONCENTRATED FUEL UNDER PASSIVE WATER MANAGEMENT, which enables passive operation of the fuel cell with direct feed of concentrated methanol or methanol vapor. The fuel cell actually embodying the invention may include a number of other components, or may omit certain components shown, while remaining within the scope of the present invention.

The illustrative embodiment of the invention is a DMFC with the fuel substance being substantially comprised of neat methanol. It should be understood, however, that it is within the scope of the present invention that other fuels may be used in an appropriate fuel cell. Thus, as noted, the word "fuel substance" shall include a substance that is substantially comprised of alcohols such as methanol and ethanol, alcohol precursors, dimethyloxymethane, methylorthoformate or combinations thereof and aqueous solutions thereof, and other carbonaceous substances amenable to use in direct oxidation fuel cells and fuel cell systems. Furthermore, it should be understood that the fuel substance itself may be in the form of a gel, a vapor, a liquid, or a combination of any of these forms, and the invention is not limited to any particular fuel form. In addition, a variety of fuel delivery systems, including a centralized fuel reservoir, a cartridge and the like, may be employed with the inventive fuel cells, fuel cell arrays and fuel cell systems.

One architecture for a fuel cell is illustrated in FIG. 1 for illustrative purposes only, and the invention is not limited to that architecture. Fuel cells, fuel cell arrays, and fuel cell systems of many different architectures could be used while remaining within the scope of the present invention. The fuel cell 100 (FIG. 1) includes a catalyzed membrane electrolyte 104, which may be a protonically conductive, electronically non-conductive membrane, sometimes referred to herein as a "PCM". As noted, in certain applications of the invention, an intrinsically protonically conductive membrane may be employed, though the invention is not limited to such membranes. One example of the material that may be used for the catalyzed membrane, which is commercially available is NAFION®, a registered trademark of E.I. Dupont de Nemours and Company, a cation exchange membrane based on a polyperflourosulfonic acid in a variety of thicknesses and equivalent weights. The membrane is typically coated on each face with an electrocatalyst such as platinum or a platinum/ruthenium mixture or allied particles. Thus, following the application of the appropriate catalyst, it is referred to herein as the "catalyzed membrane electrolyte." One face of the catalyzed membrane electrolyte is the anode face or anode aspect 106. The opposing face of the catalyzed membrane electrolyte 104 is on the cathode side and is herein referred as the cathode face or the cathode aspect 108 of the membrane electrolyte 104.

The anode reaction is: $CH_3OH+H_2O \rightarrow 6H^+ +6e^- +CO_2$. In accordance with this reaction, one molecule of methanol and one molecule of water react at the anode face 106 of the membrane electrolyte 104, the result of which is that 6 protons ($6H^+$) cross through the membrane 104. This is made possible by the well-hydrated NAFION® substance of the membrane, which allows the protons to be carried across the membrane 104. On the cathode side, ambient air is introduced into the cathode portion of the fuel cell 100 via the cathode filter 120 as illustrated by the arrow 122. The reaction at the cathode aspect 108 of the membrane 104 is $$6H^+ + 6e^- + \frac{3}{2}O_2 \Rightarrow 3H_2O.$$

Thus, the protons and electrons combine with oxygen in the ambient air at the cathode face 108 to form water ($H_2O$). This water can escape from the cathode face of the cell primarily in the form of water vapor as illustrated by the arrow 130.

At the anode side, the fuel is delivered through a gap full with vapor 180 anode diffusion layer 160, and the anode reaction includes the generation of carbon dioxide at the anode aspect 106 of the membrane 104. Carbon dioxide exits the fuel cell 100 via carbon dioxide removal channels, or openings, illustrated at 140 and 144, in the direction of the arrows 172 and 170, respectively. Various methods of accomplishing such carbon dioxide removal are discussed in the above-cited commonly-owned U.S. Pat. No. 6,981,877, U.S. Pat. No. 7,407,721 and U.S. Patent Application Publication No. 2004/0062980.

It is particularly desirable to avoid excess water loss at the cell cathode in order for the cell to be operable with neat methanol feed at the cell anode without water recovery from cell cathode. To prevent liquid water from penetrating through the cathode diffusion, a highly hydrophobic diffusion layer 150 with sub-micrometer pores is used. The static hydraulic pressure generated by the capillary force of the hydrophobic micropores and exerted on the liquid water is sufficiently high to drive the liquid water back from the cathode through a polymer electrolyte membrane, such as NAFION®, to the cell anode.

In accordance with one embodiment of the present invention, a gel fuel 190 may be contained within a fuel cartridge 192 that is then adhered to the anode aspect of the fuel cell 100. The fuel gel substance emits fuel vapor that travels to the anode aspect by way of a fuel vapor permeable layer 196, through the vapor gap 198, in the direction of the arrow 109. Thus, the fuel substance 190 is delivered directly from the gel, and water is pushed back across the membrane, which means that there is no need for water recirculation, or fuel and water mixing chambers, or the like. Further details of the operation of such a fuel cell are provided in previously-cited U.S. patent application Ser. No. 10/688,433 by Juan J. Becerra et al. for FUEL SUBSTANCE AND ASSOCIATED CARTRIDGE FOR FUEL CELL. The type of fuel cell described in FIG. 1 can be used in the curved, contour-molded fuel cell array of the present invention illustrated in FIG. 2. The conformable fuel cell array 200, shown in FIG. 2, contains a catalyst-coated membrane electrolyte and anode and cathode diffusion layers, as described in the fuel cell of FIG. 1.

As used herein, when used to describe a fuel cell, a fuel cell array or a fuel cell system, "conformable" shall mean being fabricated in such a fashion as to generally conform to the contours of the desired application or being sufficiently pliable to allow the assembly to meet a variety of shapes or to change shape based on the form of the object to which it is attached. The formed current collectors, such as the anode current collector 206 (visible in FIG. 2), and a cathode current collector (not shown) are provided on either side of the membrane electrode assembly and other components. These current collectors are preferably comprised of a material that can be deformed into a desired shape and then retain that shape while providing for the desired thinness of the assembly. The current collector should, in this embodiment, maintain sufficient rigidity to effectively render good compression over the active area following clamping at the edges of all unit cells by the molded frame. Suitable materials include, but are not limited to an open wire mesh, a stamped piece of stainless steel, or other conductive moldable material, which when applied using methods known to those skilled in the art, for example, with heat will take a particular shape and retain that shape. Typically, this includes the application and/or release of heat or pressure to the assembly.

The contour-molded fuel cell array can be constructed in accordance with an insert molding process, which can be briefly summarized as follows. The fuel cell components are assembled on a lead frame structure, which is used to facilitate the molding process. The lead frame, containing the previously assembled components of the fuel cell, is inserted into a mold cavity. A set of mold plates include components that impart a desired shape or form to the moldable material that is received, and which allow the moldable material, when solidified, to assume the desired shape. In accordance with the present invention, the mold plates will have the desired shape of the body segment or other contour that is amenable to the application for which the fuel cell is employed. Thus, the mold plates are designed in a particular shape for a particular application of the invention. Further details of one type of insert molding technique are provided in commonly-owned U.S. patent application Ser. No. 10/650,424 of Fannon et al. for a METHOD OF MANUFACTURING A FUEL CELL ARRAY AND RELATED ARRAY, filed on Aug. 28, 2003, which is incorporated herein by reference.

Figure 2:
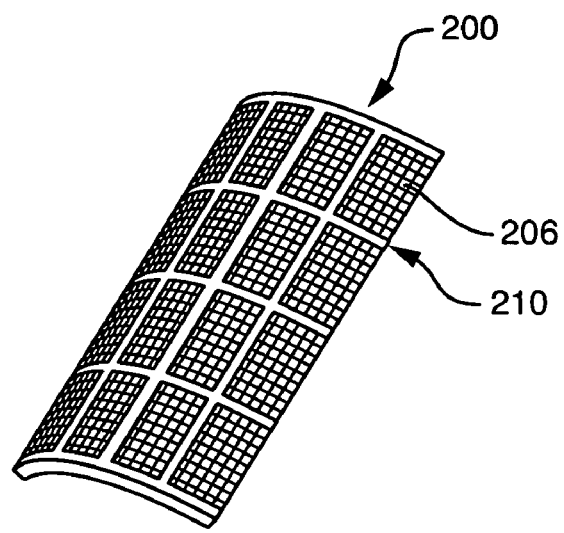
FIG. 2 is a conformable fuel cell array that is contour-molded in accordance with one embodiment of the present invention.

A moldable material, such as plastic, is next introduced into the mold cavity to create a tight frame around the fuel cell. Once the frame is set, it seals the edges of the cells and of the overall array against leaks, which eliminates the need for additional gaskets. Importantly. the frame holds the components of the fuel cell in compression without the need for screws and nuts, which are thus completely eliminated. Thus, the resulting fuel cell has a contoured shape and achieves the compression needed for obtaining good fuel cell performance along the active surface of the fuel cell by combination of the clamping provided over all cell edges by the plastic frame and the rigidity of the pre-shaped current collectors (FIG. 2). Preferably, the molded frame is designed to apply adequate compression to ensure good mechanical and electrical contact. For example, in accordance with one aspect of the invention, the compression is approximately 100 psi (or greater) along the active area of all unit cells. However, it should be understood that there is a wide range of compression values that could be achieved depending upon on the materials and architecture of the fuel cell system. As noted, further details of one type of insert molding technique are provided in commonly-owned U.S. patent application Ser. No. 10/650,424 of Fannon et al. for a METHOD OF MANUFACTURING A FUEL CELL ARRAY AND RELATED ARRAY, filed on Aug. 28, 2003, which is incorporated herein by reference.

An important aspect of this teaching is that a fuel cell and injection molded frame that is relatively thin has been demonstrated. Depending on the materials and application, it may be less than 3 mm. Thinness of properly chosen cell components enables the desirable combination of overall array flexibility and sufficient compression over the active area of the cell.

As noted, the frame 210 retains the fuel cell 200 in the desired curvilinear shape after the molding thereof. Although not limiting to the invention, the mold plates could be designed to produce a fuel cell that could be worn as a cuff on an arm or a leg portion, could be formed in the shape of a vest, or an insert for a shoe or glove or to be placed in/on other suitable accessories such as a belt. A fuel cell would then power devices being used by the individual wearing the fuel cell, or alternatively, the fuel cell could formed or fastened in such a manner to conform to the shape of an application device. The fuel cell 200 of FIG. 2 will be supplied with an appropriate fuel delivery mechanism. Depending on the geometries involved, certain fuel delivery methods may be more amenable to use with certain types of shapes. Presently, one preferred method is that a layer of a gelled fuel substance is provided within the frame 210, under current collector 206 with the gel compartment following the curvature of the fuel cell array. In this embodiment one method is to add the gelled fuel into the gel compartment after the molding process, and to make such compartment removable. The gel emits fuel vapor directly to the anodes of all cells , reducing the possibility of leakage that could be presented when using a liquid fuel.

As noted above, it should be understood that the fuel substance may be in form of a gel, a vapor, a liquid, or a combination of any of these fuel forms, and the invention is not limited to any particular fuel form. Furthermore, A variety of fuel delivery systems, including a centralized fuel reservoir, a cartridge and the like, may be employed with the invention.

The gelled fuel or a liquid fuel substance may be contained in a cartridge. The cartridge is comprised of any material that is non-rupturable and is substantially non-reactive with fuel substances. It would also be desirable if the material were lightweight. The cartridge has a body portion, which is substantially filled with fuel. A seal (not shown) would be removed when the user begins to operate the associated fuel cell. Then, liquid fuel or a vaporous fuel travels through the tubing to the anode portion of the fuel cell. Brackets can be used for a strap or other mechanism that is used for holding the cartridge steady on a holster, in a pocket or otherwise as worn by the user. Fuel transport from such a cartridge to the array, does not necessarily require any pumping. Liquid fuel from the cartridge could, for example, wick into a thin layer of foam placed behind the gel in the fuel compartment of the array, and maintain a uniform film of liquid fuel along the back surface of the gel. Fuel will be taken up by the gel from the foam, following significant utilization of methanol for the cell process.

Figure 3:
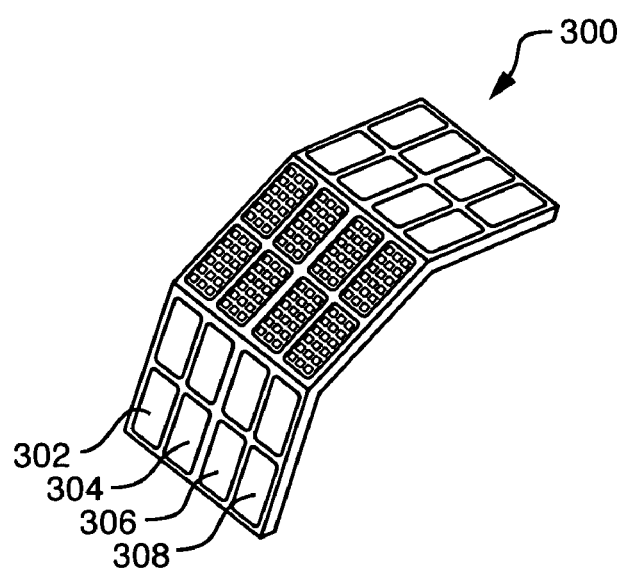
FIG. 3 is a fuel cell made of planar segments with adjustable inter-segment angle in accordance with the present invention.

In accordance with a further embodiment of the present invention, a number of small individual planar fuel cells are connected together as segments of the overall array, making such array conformable. This is illustrated in FIG. 3, in which a segmented fuel cell array 300 has multiple fuel cells, such as the fuel cells 302, 304, 306 and 308 that are mechanically and electrically connected together to form a fuel cell array 300. As is visible from FIG. 3, the array 300 is constructed with inter-segment flexibility so that it can conform to non-planar shapes. It should be further understood that the individual fuel cells can be constructed to be quite small and the inter-segment tie can be constructed in such a manner that the overall array can have a substantially curvilinear shape. This array 300 can then be fastened or otherwise secured to a body location such as the back or stomach or to a device with a curved outer surface. The fuel cell 300 has anode plates that provide for simple interconnection with the next cell cathode plate. The interconnection between the cells can be, for example, a flexible, electrically insulating material with embedded electrical connections to properly connect the cell's anode to cathode. Depending on the application, the individual cells in the array may be connected in series or in parallel, depending on the power requirements of the application or desired output characteristics of the fuel cell array.

As noted above, the embodiment illustrated in FIG. 3 may be used with any fuel substance, or fuel delivery system, depending upon the particular application with which the fuel cell system is employed. The fuel delivery is similar to that described with respect to FIG. 2, in that fuel can be contained within a separate cartridge, or can be included, for example in gel form, in a compartment within the layered structure of the fuel cell from where it emits fuel in vapor form to the anode aspect of the fuel cell Liquid fuel can placed in a cartridge, coupled to the anode aspect of all cells in 300, feeding replacement fuel to the fuel cell. A hydrophilic foam or wick adjacent the gel can be used to draw liquid fuel from the external cartridge to the anode aspect of the fuel cell without the use of a pump.

Figure 4:
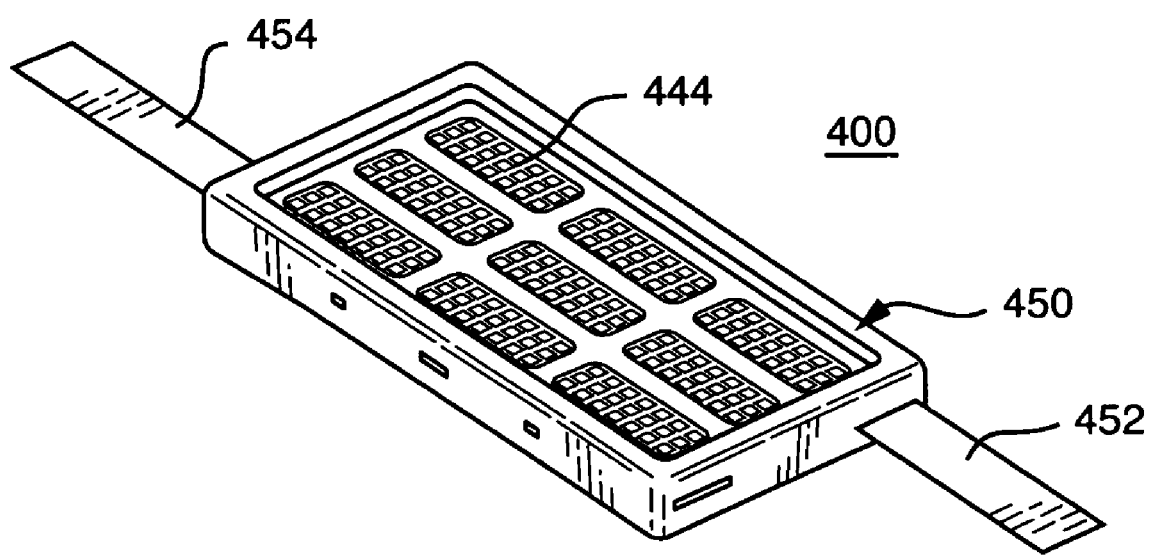
FIG. 4 is example of one planar segment contained within an angle adjustable segmented fuel cell of the type shown in FIG. 3.

One exemplary nine cell planar array that can serve as a building block for conformable fuel cell array 300 is illustrated in FIG. 4. It may operate on a gel fuel (not shown) that may be contained within an associated cartridge. The nine fuel cell unit array 400 has a cathode current collector 444, which forms the top layer of each individual fuel cell. An outer plastic frame 450 is formed using the insert molding techniques herein described. Electrical leads 452, 454 provide the electrical connections that are made to either an adjacent nine fuel cell unit array or to the application device or to power conditioning circuitry as may be needed in a particular application of the invention. Such planar array building blocks can be constructed of individually molded single fuel cells subsequently connected to form a planar unit of the type shown in FIG. 4, or the entire planar fuel cell array building block, can be manufactured and sealed in a single mold as shown in FIG. 4.

Figure 5B:
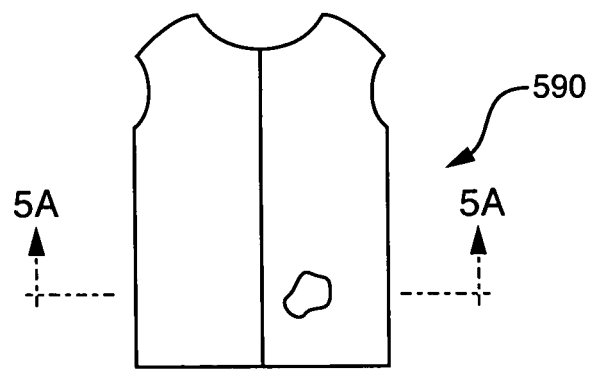
FIG. 5B is a schematic illustration of one implementation of the fuel cell component of FIG. 5A, which itself comprises a part of an article of clothing.
Figure 5A:
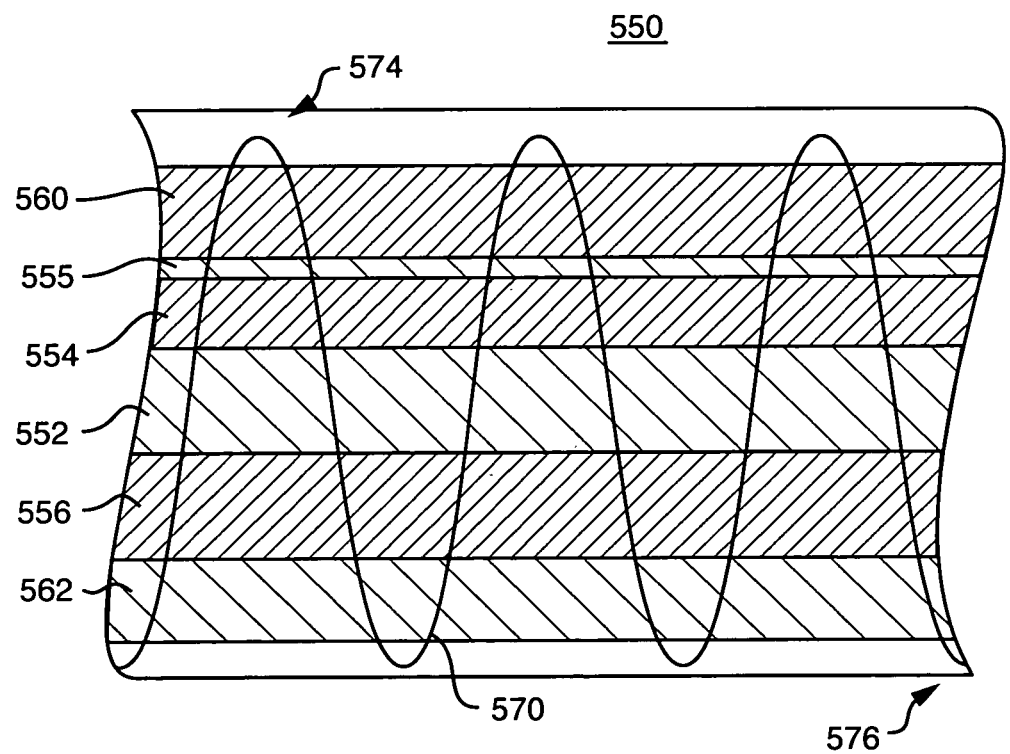
FIG. 5A is a schematic illustration of a cross section of a pliable fuel cell in accordance with another embodiment of the invention, taken along line AA of FIG. 5B.

In accordance with a further embodiment of the invention, a pliable fuel cell is illustrated in FIGS. 5A and 5B. In this embodiment, the fuel cell becomes an integral part of either an application device or an article of clothing, and adopts its overall form. A thick fabric is used to enclose the fuel cell and the fuel cell components are contained within the thick outer fabric layers.

Fuel cell portion 550 (FIG. 5A) includes a membrane electrode assembly 552. The membrane itself is preferably comprised of NAFION® and the overall membrane electrode assembly will include diffusion layers such as an anode diffusion layer 554 and cathode diffusion layer 556, which manage fuel substances, water, and effluents throughout the fuel cell. A flexible current collector 560 is located at the anode side and a corresponding flexible current collector 562 is placed at the cathode side. The flexible current collectors 560, 562 may be comprised of a wire mesh, a screen, metallized threads or any other very flexible, conductive mesh, that also exhibits high strength.

As noted above, a significant challenge in designing a conformable fuel cell is achieving adequate compression within the fuel cell. One way to maintain the fuel cell layers in place and to provide adequate compression along the major surfaces of the fuel cell of FIG. 5A, is to employ a non-conductive stitching component 570 that is woven between the layers of the fuel cell. This non-conductive stitching extends from the cathode side flexible current collector 562, through the diffusion layers, and the MEA to the anode-side current collector 560 and back again repeatedly thus pulling the two current collectors 560 and 562 towards each other, thus imparting compression to the fuel cell layers along the major surfaces of the fuel cell layers. The metal mesh-like screens 560, 562 conduct the electrons through the cell, while the nonconductive stitching material imparts compression without creating short circuits or otherwise interrupting the electrochemical reactions occurring within the fuel cell.

The stitching 570 can be substantially comprised of any non-conductive material, such as a polymer, and it can be threadlike with a uniform cross section, or it may have a ribbon-like dimension in some portions, for example, where it crosses outside of the fuel cell, and can be like a non-conductive thread in the areas where it crosses through the fuel cell layers, especially where it crosses through the MEA.

The fuel cell layer components are encapsulated, possibly together with a conformable compartment containing the fuel, possibly in gel form, in a plastic or polymer sealing layer 574, 576 while leaving the cathode surface sufficiently exposed for air breathing and then the overall fuel cell is placed within a pliable cloth that will cover the fuel cell but can also have the comfort and appearance of clothing, in a wearable fuel cell, such as the vest 590 illustrated in FIG. 5B. This construction will provide mobility for the user while powering the user's application devices with minimal or no further need for batteries.

In accordance with a further aspect of the present invention, in certain instances additional compression may be applied by employing the swelling of NAFION® to induce additional compression. In that embodiment, this NAFION® expansion material is also the membrane electrolyte of the fuel cell. The expansion of this layer, in turn, causes compression within the overall sealed fuel cell. If the stitching 570 (FIG. 5A) is used, then the fuel cell components are preferably stitched in the non-swollen state and then hydration causes swelling and thus compression. Alternatively, the stitching can be applied when the MEA is in a compressed state. It is further within the scope of the invention to employ a dedicated layer between the anode current collector and cathode current collector, for example, that is capable of expanding or swelling within the fuel cell without preventing the operation of the fuel cell system, such as the layer 555 in FIG. 5A. It should be understood that such a layer may be placed in other locations within the fuel cell such as between the MEA and the diffusion layer, or the fuel cell may include several expansion layers in various locations, while remaining within the scope of the present invention.

It should be appreciated that the present invention provides a conformable fuel cell which can be incorporated as an integral part of a soldier's uniform or other person's article of clothing, which can also change shape as the individual moves about, for example, when the fuel cell is incorporated into a shirt sleeve, the fuel cell can bend and flex as the user's arm makes such motions. Alternatively, the fuel cell of the present invention may be incorporated as one of the walls or the complete envelope around a device, employing a simple fuel delivery mode of methanol (or other carbonaceous fuel) from an incorporated fuel compartment and/or an adjacent cartridge, with no pumping required, and no water recirculation required.

The invention provides significant weight, form factor, and volume advantages, as well as allowing for quick refueling by cartridge replacement.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. A conformable fuel cell, comprising:
   (A) a membrane electrolyte intimately interfacing with a catalyst layer along each of the membrane's major surfaces being a catalyzed membrane electrolyte, having an anode aspect and a cathode aspect, and which catalyzed membrane electrolyte is conformable to a plurality of desired shapes;
   (B) diffusion layers sandwiching said catalyzed membrane electrolyte, said diffusion layers being comprised of materials that are conformable;
   (C) flexible current collectors coupled with each of said anode aspect and said cathode aspect of said membrane electrolyte;
   (D) a fuel delivery means coupled with said anode aspect of said membrane electrolyte that delivers fuel substantially uniformly to said anode aspect while said fuel cell maintains a desired shape;
   (E) a conformable fuel cell housing formed from a molded plastic frame that has been formed according to said desired shape, said conformable fuel cell housing maintaining high compression along the active surfaces of the fuel cell;
   (F) electrical coupling disposed across said anode aspect and said cathode aspect and having means for connection to an application device being powered by said fuel cell; and
   (G) a dedicated layer of material that substantially expands upon hydration, thus imparting compression.

2. The conformable fuel cell as defined in claim 1 wherein said current collectors at each of said anode aspect and said cathode aspect apply adequate compression effectively over the active area of the membrane electrolyte.

3. The conformable fuel cell as defined in claim 2 wherein said compression applied to said active area is equal to or greater than about 100 psi.

4. The conformable fuel cell as defined in claim 1 further comprising management of water from cathode to anode such that water management is achieved within the fuel cell.

5. The conformable fuel cell as defined in claim 1 wherein said fuel is substantially comprised of at least one of the following: a vapor fuel, a gel fuel, a liquid fuel and combinations thereof.

6. The conformable fuel cell as defined in claim 1 wherein said conformable fuel cell is shaped to conform to one of the following:
   (A) a body segment; and
   (B) a contoured wall of an application device; and
   (C) an exterior housing or an interior volume of an application device.

7. The conformable fuel cell as defined in claim 1 wherein said conformable fuel cell is configured to attach to an article of clothing mechanically.

8. The conformable fuel cell as defined in claim 1 wherein fuel delivery is accomplished from a detachable conduit that connects to said anode aspect of the fuel cell.

9. A conformable fuel cell, comprising:
   (A) a membrane electrolyte intimately interfacing with a catalyst layer along each of the membrane's major surfaces being a catalyzed membrane electrolyte, having an anode aspect and a cathode aspect, and which catalyzed membrane electrolyte is conformable to a plurality of desired shapes;
   (B) diffusion layers sandwiching said catalyzed membrane electrolyte, said diffusion layers being comprised of materials that are conformable;
   (C) flexible current collectors coupled with each of said anode aspect and said cathode aspect of said membrane electrolyte;
   (D) a fuel delivery means coupled with said anode aspect of said membrane electrolyte that delivers fuel substantially uniformly to said anode aspect while said fuel cell maintains a desired shape;
   (E) a conformable fuel cell housing formed from a molded plastic frame that has been formed according to said desired shape, said conformable fuel cell housing maintaining high compression along the active surfaces of the fuel cell;
   (F) electrical coupling disposed across said anode aspect and said cathode aspect and having means for connection to an application device being powered by said fuel cell; and
   (G) a dedicated layer of material that substantially expands upon exposure to fuel, thus imparting compression.

10. The conformable fuel cell of claim 1, wherein the conformable fuel delivery means comprises a layer of gelled fuel.

11. The conformable fuel cell of claim 1, wherein the conformable fuel delivery means is affixed to the anode aspect of the fuel cell.

* * * * *